March 9, 1943.  R. WILES  2,313,608
WIND INDICATOR FOR RIFLE SHOOTING
Filed Aug. 30, 1939
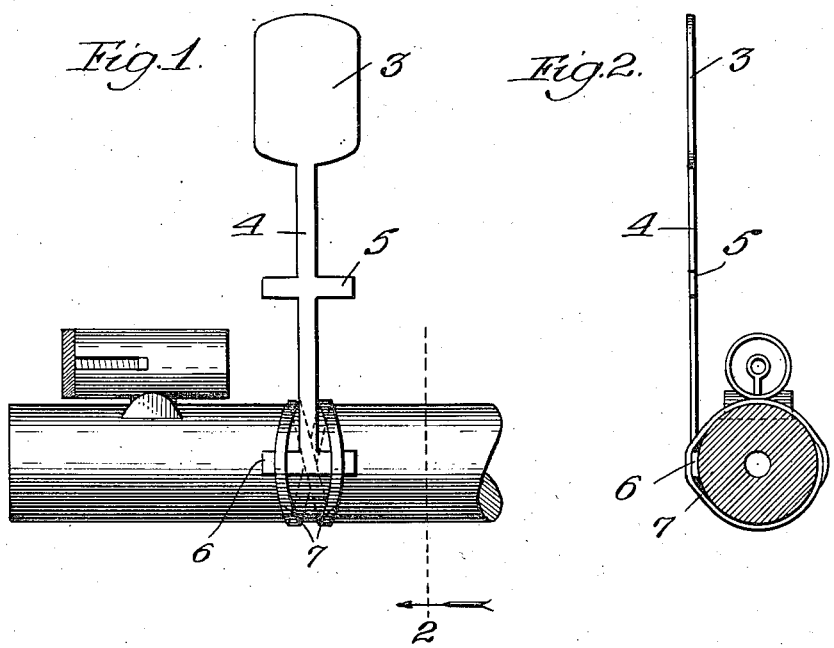
Inventor:
Russell Wiles,

UNITED STATES PATENT OFFICE 2,313,608

WIND INDICATOR FOR RIFLE SHOOTING

Russell Wiles, Chicago, Ill., assignor to Russell Wiles, Jr., Chicago, Ill.

Application August 30, 1939, Serial No. 292,728

4 Claims. (Cl. 42—1)

This invention is a wind indicator for rifle shooting, and is fully described herein and illustrated in the accompanying drawing, in which—

Figure 1 is a side elevation of the device in place on the muzzle of a rifle; and Figure 2 is a section on the line 2 of Figure 1.

In target shooting, considerable difficulty is experienced, particularly when firing in changing wind, because even though the shooter carefully observes the usual indices of wind velocity and direction, as soon as he begins to aim these are no longer visible, and, if the wind changes while he is aiming, a wild shot is almost sure to result. Since aiming always occupies several seconds, the advantage of a wind indicator visible while aiming is obvious.

The present device gives a satisfactory indication of the cross component of wind velocity in which alone the rifleman is particularly interested, and is visible at all times in the field of view presented through the rear sight.

In preferred form, the indicator is made of elastic material such as Celluloid, and consists of a head 3, a stem 4 and two cross bars 5 and 6, all integral. The indicator is held on the barrel adjacent the front sight in any desired way, preferably by a simple rubber band 7 overlying the ends of a cross bar. In light winds the device is supported by the lower cross bar as shown and, in heavy winds, which would bend the device too far over, it is supported by the upper cross bar 5.

The indicator is visible in profile, as shown in Figure 2, and is seen in the peripheral field of the rifleman's vision even when he is concentrating on the sight and the target. Obviously the curvature of the profile changes with wind pressure so as to give a general indication of velocity.

It will be understood by riflemen that no special effort is usually made to gauge or estimate the velocity of the wind at each shot. On the contrary, the rifleman attempts to get off his first shot when the wind approximates generally prevailing conditions for which the sight is initially adjusted, to make any necessary sight corrections from the point of impact of the first shot, and to get off his successive shots when the wind closely approximates the conditions when the first shot was fired. In other words, it is generally better practice to delay between shots so as to fire when the wind is uniform, rather than to adjust the sight from shot to shot in an effort to keep up with wind changes, unless the latter are quite radical and apparently are going to last for considerable time.

It is, therefore, not particularly important that a device of the present character shall give definite indication of velocity in miles per hour. If the rifleman fires when the curvature of the indicator is approximately constant, he does not need to interest himself particularly in what actual velocity the curvature corresponds to. It is, however, quite possible to become so familiar with the behavior of the indicator that the curvature will give a fair indication of a desirable adjustment for the first shot.

This type of indication compares fairly favorably with that which can be obtained from observing a range flag, but it does not purport to have such accuracy as is given by a good anemometer. It does, however, indicate wind changes in a very satisfactory way and adds considerably to practical accuracy without noticeably complicating the rifleman's equipment.

I claim as new and desire to secure by Letters Patent:

1. A wind indicator made of flexible sheet material having an enlarged head and a reduced stem and having means at the lower end of the stem for attaching it to the barrel of a rifle adjacent the conventional front sight on the top and approximate center of the barrel and constructed so that the plane of the sheet material of the indicator lies parallel to the barrel and line of sight, the lateral flexibility of the indicator being such that ordinary rifle wind changes produce readily visible flections of the indicator.

2. A wind indicator made of flexible sheet material with an enlarged head and a reduced stem and having at its lower end two attaching devices at different heights for attaching it to the barrel of a rifle adjacent the conventional front sight lying on the top and approximate center of the barrel, the attaching device being constructed so that the plane of the sheet material is parallel to the line of the barrel and line of sight, the flexibility of the material being such that ordinary wind changes produce visible flections of the indicator.

3. A visual wind indicator for use with a rifle, said indicator comprising a readily flexible member including means at one end adapting it for attachment adjacent the front sight of the rifle and consisting of the sole support for said indicator and a wind vane forming the other end of said indicator whereby cross winds are readily visible to the person sighting the rifle.

4. A visual wind indicator for use with a rifle, said indicator including a flat readily flexible member and means at one end of said member for securing the member to the barrel adjacent the front sight thereon, said means forming the sole support for the member and being so shaped as to hold the member substantially perpendicular to the axis of the gun barrel and with a flat side in a plane substantially parallel to the axis of the gun barrel.

RUSSELL WILES.